United States Patent [19]

Niitsuma et al.

[11] Patent Number: 5,370,917

[45] Date of Patent: Dec. 6, 1994

[54] MAGNETIC RECORDING DISC COMPRISING MAGNETIC POWDER AND A BINDER IN A CONTAINER WHICH INCLUDES A NONWOVEN FABRIC LINER COMPRISING POLYPROPYLENE AND RAYON FIBERS

[75] Inventors: Kazuhiro Niitsuma; Toshio Kawamata; Satoru Hayakawa, all of Kanagawa, Japan

[73] Assignee: Fuji Photo Film Co., Ltd., Kanagawa, Japan

[21] Appl. No.: 74,668

[22] Filed: Jun. 10, 1993

[30] Foreign Application Priority Data

Jun. 10, 1992 [JP] Japan .............................. 4-039644[U]

[51] Int. Cl.⁵ .............................................. G11B 5/00
[52] U.S. Cl. ........................................ 428/65; 428/64; 428/286; 428/287; 428/694 R; 428/900; 206/444; 360/133
[58] Field of Search ................ 428/64, 65, 286, 287, 428/694 R, 900; 206/444; 360/133

[56] References Cited

U.S. PATENT DOCUMENTS

| | | | |
|---|---|---|---|
| 4,610,352 | 9/1986 | Howey et al. | 206/313 |
| 4,695,912 | 9/1987 | Moriwaki | 360/133 |
| 4,699,268 | 10/1987 | Oishi | 206/313 |
| 4,709,816 | 12/1987 | Matsumoto et al. | 206/444 |
| 5,179,487 | 1/1993 | Niitsuma et al. | 360/133 |

FOREIGN PATENT DOCUMENTS 61-258057 11/1986 Japan .

*Primary Examiner*—Stevan A. Resan
*Attorney, Agent, or Firm*—Sughrue, Mion, Zinn, Macpeak & Seas

[57] ABSTRACT

A magnetic recording disc is disclosed which comprises a disc container with a liner comprising nonwoven fabric in which a flexible magnetic disc comprising a flexible non-magnetic support having on at least one side thereof a magnetic layer mainly comprising a ferromagnetic powder and a binder resin is rotably set, wherein said liner comprises (1) a nonwoven fabric layer mainly comprising rayon fiber on at least the side in contact with the magnetic layer, and (2) a nonwoven fabric layer mainly comprising polypropylene fiber, and said liner comprises from 70 to 80% by weight based on the liner of rayon fiber and from 20 to 30% by weight based on the liner of polypropylene fiber.

5 Claims, 2 Drawing Sheets

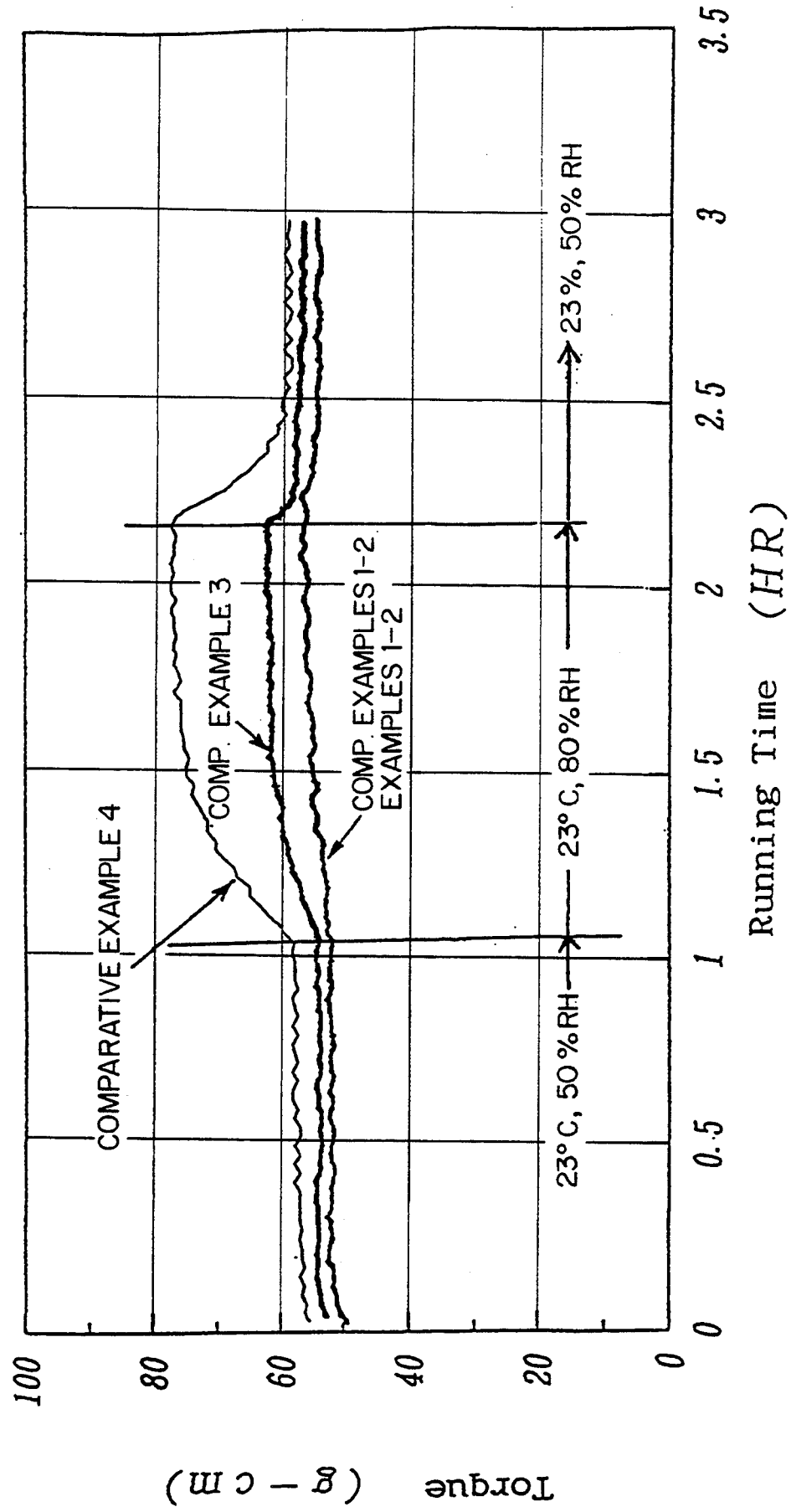

MAGNETIC RECORDING DISC COMPRISING MAGNETIC POWDER AND A BINDER IN A CONTAINER WHICH INCLUDES A NONWOVEN FABRIC LINER COMPRISING POLYPROPYLENE AND RAYON FIBERS

FIELD OF THE INVENTION

This invention relates to a magnetic recording medium comprising a nonwoven fabric-lined container in which a flexible magnetic disc is rotably set. More particularly, it relates to a magnetic recording disc, the container of which is lined with nonwoven fabric having improved fabricability (i.e., workability) and hardly causing dropout.

BACKGROUND OF THE INVENTION

Magnetic recording discs are composed of a lined disc container, called a cartridge case (i.e., a cartridge or a jacket), having windows, e.g., a magnetic head (i.e., a magnetic head-inserting gate) window and a hole for disc rotation-driving, and a flexible magnetic disc rotably set in the lined container.

The liner of the disc container serves for smooth rotation of the flexible magnetic disc and for cleaning the surface of magnetic layer. The liner, single-layered or multi-layered, is made of nonwoven fabric mainly comprising, for example, rayon fiber, rayon/polypropylene mixed fiber, polyethylene terephthalate fiber, acrylic/polyester mixed fiber, acrylic/rayon mixed fiber, etc. bound by heat-fusing or with an adhesive and is fixed to the inner wall of a disc container. The nonwoven fabric usually contains therein a lubricant, a dispersant, and an antistatic agents e.g., polyoxyethylene, a glycol fatty acid ester or a sodium alkylsulfate, each in an amount of from 0.1 to 0.5% by weight by impregnation.

From the viewpoint of magnetic layer surface cleaning properties, nonwoven fabric mainly comprising rayon fiber is excellent as disclosed in JP-A-U-62-15172 (the term "JP-A-U" as used herein means an "unexamined published Japanese utility model application"). Besides, nonwoven fabric mainly comprising rayon fiber is less causative of damage to the surface of a magnetic layer than other fibers.

However, rayon fiber has a high water (or moisture) absorption which reaches about 27 to 28% in a high humidity environment of 95% RH (relative humidity). Therefore, a liner comprising rayon fiber expands in thickness on moisture absorption and increases its contact pressure against a magnetic disc, resulting in a rise of the running torque.

With respect to a method for obtaining a liner having nonwoven fabric mainly comprising rayon fiber on the side in contact with a magnetic layer, a liner comprising nonwoven fabric of 100% by weight rayon fiber has been proposed. In formation of nonwoven fabric, because a conventional heat-fusing process is not applicable to 100% rayon nonwoven fabric which is not thermoplastic, 100% rayon nonwoven fabric has been prepared by a latex process using an adhesive, a water stream interlocking process using a water jet stream, and the like.

However, the latex process is disadvantageous in that the adhesive, such as SBR adhesives or NBR adhesives, tends to fall off (or peel off) and adhere to a magnetic layer to cause dropout or damage to the surface of a magnetic layer. Such tendency is conspicuous particularly under a high temperature environment.

On the other hand, the water stream interlocking process gives only weak interlocking to fibers. The nonwoven fabric prepared by this process, when applied as a liner, suffers from an increased frequency of fall-off of fibers during running. As a result, cases are met in which temporary dropout increases or fallen fibers squeeze themselves between a head and a magnetic layer to cause scratches on the magnetic layer.

U.S. Pat. No. 4,610,352 (corresponding to JP-A-61-258057) discloses nonwoven fabric prepared by heat-fusing of rayon fiber as an outer layer and a nylon fiber as an inner layer. However, nylon fiber has a water (or moisture) absorption of about 8 to 9% in a 95% RH environment, and the rayon/nylon double layered nonwoven fabric causes an increase of torque similarly to 100% rayon nonwoven fabric.

In fabrication (i.e., working) of nonwoven fabric into a liner for a disc container, the fibers are generally bonded to each other with an adhesive or by heat-fusing so that the fibers may not fall off to cause dropout, and then punched out into a specific shape. Since an adhesive used for fiber bonding frequently comes off nonwoven fabric to cause dropout, a liner is usually formed by heat-fusing of nonwoven fabric. Further, it is important for nonwoven fabric as a liner to hardly produce fiber waste causing dropout, on punching.

Of nonwoven fibers, polypropylene fiber is excellent in heat-fusibility and fabricability (i.e., workability), has satisfactory dimensional stability owing to small hygroscopicity, and is relatively cheap so that it has been widely employed as described, e.g., in JP-A-U-60-23969, JP-A-60-179944, and JP-A-62-257625 (the term "JP-A" as used herein means an "unexamined published Japanese patent application").

Hence, nonwoven fabric comprising mixed fiber of rayon and polypropylene has been proposed as a liner manifestating the above-mentioned advantages of polypropylene fiber and the excellent cleaning properties of rayon fiber, as disclosed in JP-A-62-257625. However, conventionally proposed nonwoven fabric of rayon/polypropylene mixed fiber, such as "149-303" produced by Veratec Co., has a disadvantage that when the nonwoven fabric is heat-fused under pressure and heat through calendar rolls, a part of polypropylene fiber forms small particles, which afterward not only fall off the nonwoven fabric to cause dropout but also scratch the surface of a magnetic layer.

Other known nonwoven fabric, such as rayon/polyester mixed nonwoven fabric "149-188" produced by Veratec Co., Ltd., is less fabricable than polypropylene nonwoven fabric, causing a considerable (i.e., workable) reduction in working life of a cutter used for fabrication or leaving cutting dust (fiber waste) in a liner sheet to cause dropout.

Three-layered nonwoven fabric using nylon fiber, such as "149-246" produced by Veratec Co., Ltd. (composed of inner and outer layers of rayon fiber and an intermediate layer of nylon fiber) undergoes large dimensional changes with changes in humidity because rayon fiber and nylon fiber both have a high moisture (or water) absorption as described above, causing a great increase in torque. When applied to a floppy disc drive designed to have a low motor torque, a magnetic recording disc sometimes fails to rotate.

On the other hand, with the recent increase of demand for improved recording density of magnetic recording media, an increase in recording capacity from 1 MB to 4 MB and further to 10 MB or even higher has been demanded. To meet the demand, study has been given to a ferromagnetic metal powder mainly comprising Fe, Ni or Co or a tabular hexagonal ferrite powder such as barium ferrite for use as a ferromagnetic powder in magnetic recording discs.

That is, an increased recording density can be obtained by using extremely small particles of these ferromagnetic powders, i.e., a ferromagnetic metal powder having a specific surface area ($S_{BET}$) Of at least 30 m²/g and a crystallite size of not more than 300 Å as measured by X-ray diffractometry, or a tabular hexagonal ferrite powder having a specific surface area of at least 25 m²/g, an tabular ratio of from 2 to 6, and a length in the long axis of from about 0.02 to 1.0 μm. According as a recording density is thus increased, the above-mentioned problem of dropout has become more acute.

SUMMARY OF THE INVENTION

An object of the present invention is to provide a magnetic recording disc which less frequently incurs defects including dropout and has excellent durability.

The above object of the present invention is accomplished by a magnetic recording disc which comprises a disc container with a liner comprising nonwoven fabric in which a flexible magnetic disc comprising a flexible non-magnetic support having on at least one side thereof a magnetic layer mainly comprising a ferromagnetic powder and a binder resin is rotably set, wherein said liner comprises (1) a nonwoven fabric layer mainly comprising rayon fiber on at least the side in contact with the magnetic layer (hereinafter referred to as a magnetic layer side), and (2) a nonwoven fabric layer mainly comprising polypropylene fiber, and said liner comprises from 70 to 80% by weight based on the liner of rayon fiber and from 20 to 30% by weight based on the liner of polypropylene fiber.

That is, the nonwoven fabric layer mainly comprising polypropylene fiber is present on the container side or between the nonwoven fabric layer mainly comprising rayon fibers as an intermediate layer.

BRIEF DESCRIPTION OF THE DRAWINGS

FIG. 5 is a graph of torque vs. running time under a varied humidity condition.

DETAILED DESCRIPTION OF THE INVENTION

According to the present invention, the nonwoven fabric mainly comprising rayon fiber which is equipped at least on the magnetic layer side of the liner exhibits satisfactory properties of cleaning the magnetic layer and hardly causes scratches on the surface of the magnetic layer. Since the nonwoven fabric mainly comprising polypropylene fiber can be fabricated into a liner by punching with minimized cutting dust, occurrence of dropout due to cutting dust can be reduced. Further, since the nonwoven fabric mainly comprising polypropylene fiber is in the central portion of the liner in the thickness direction, even if the polypropylene fiber forms heat-fused particles when fabricated into a liner by heat-fusing, the particles are prevented from falling on a flexible magnetic disc to cause dropout or from scratching a magnetic layer or scratching the fiber which also causes dropout. Accordingly, the magnetic recording disc of the present invention exhibits stable torque characteristics during running even in a high humidity environment to thereby achieve recording with reliability under broadened environmental conditions.

Rayon/polypropylene mixed fiber which has conventionally been used as a liner partly undergoes heat-melting to form small particles on exposure to pressure or heat of calendering in fabrication into nonwoven fabric, and the particles tend to come off and stick to a magnetic layer to cause dropout.

By providing the polypropylene fiber in the middle portion of a liner, with at least the outer layer (i.e., on the side in contact with the magnetic layer) or preferably both of an inner layer (i.e., on the side in contact with the disc container) and outer layer comprising rayon fiber, the heat and pressure of calendering are absorbed by the rayon fiber to prevent part of polypropylene fiber from forming small particles. Even if small particles should be formed, they are confined within the middle between the inner and outer layers and hardly adhere to the magnetic layer.

Further, polypropylene fiber is stronger than other fibers and in particular greatly wears with sliding friction with a magnetic layer, causing damage to the magnetic layer or causing part of fiber to fall off and adhere to the magnetic layer, resulting in occurrence of dropout. These problems are solved in the present invention by forming the magnetic side layer of a liner mainly comprising the rayon fiber.

The magnetic recording disc according to the present invention will be described by referring to the accompanying drawings.

Figure 1:
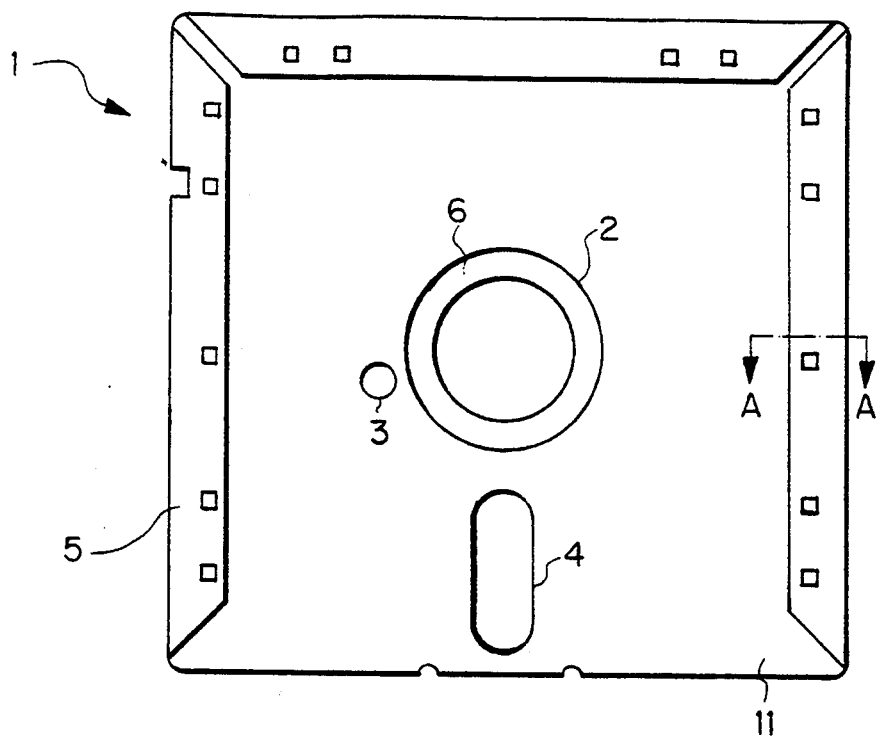
FIG. 1 is a plane view of a 5.25 inch floppy disc according to the present invention.

In FIG. 1 is shown a plane view of 5.25 inch floppy disc 1 composed of jacket 1 with windows (central window 2, index window 3, and head window 4) and turned edges 5, in which flexible magnetic disc 6 is rotably set.

Figure 2:
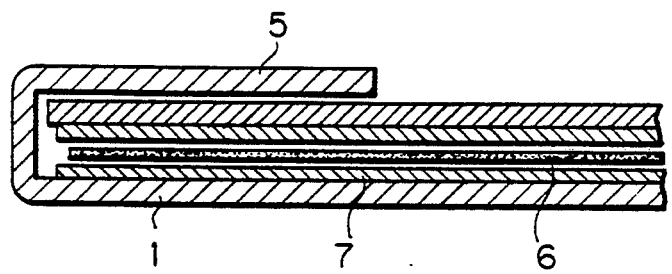
FIG. 2 is a partial sectional view of the floppy disc of FIG. 1.

FIG. 2 is a cross section of FIG. 1 along line A—A'. Liner 7 is provided on both the upper and lower inner wall of jacket 1, and flexible magnetic disc 6 is set therebetween. Liner 7 is usually fixed to the inner wall of jacket 1.

Figure 3:
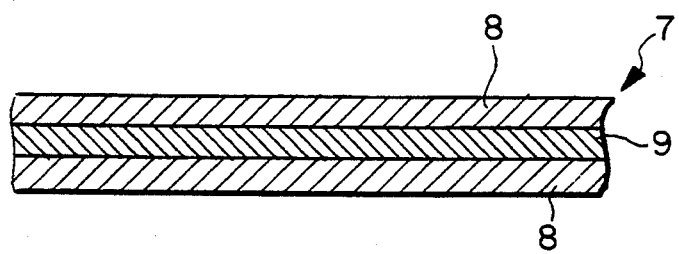
FIG. 3 is a partial sectional view of a liner of a magnetic recording disc according to the present invention.

The sectional view of FIG. 3 illustrates a preferred embodiment of liner 7, in which liner 7 has a three-layered structure composed of a pair of nonwoven fabric layers 8 mainly comprising rayon fiber with nonwoven fabric layer 9 mainly comprising polypropylene fiber being sandwiched therebetween. As long as the magnetic layer side of liner 7 is made mainly of rayon fiber, liner 7 may have a double-layered structure composed of a nonwoven fabric layer mainly comprising rayon fiber as an outer layer (on the magnetic layer side) and a nonwoven fabric layer mainly comprising polypropylene fiber as an inner layer (on the container side). With fabricability in calendering to form nonwoven fabric into a liner under heat and pressure and fabricability in integrating a magnetic recording disc into a lined-container being taken into consideration, it is preferable to provide nonwoven fabric layer mainly comprising polypropylene fiber as an intermediate layer. In this case, it is especially desirable that the inner and outer layers sandwiching the intermediate layer are substantially equal in volume and both layers mainly comprise rayon fibers.

Nonwoven fabric mainly comprising rayon fiber and nonwoven fabric mainly comprising polypropylene fiber are fabricated into a liner of the present invention usually by heat-fusing (bonding). Therefore, the boundary between them is not always clear, and the layer structure of the liner cannot be specified by thickness of each layer.

Figure 4:
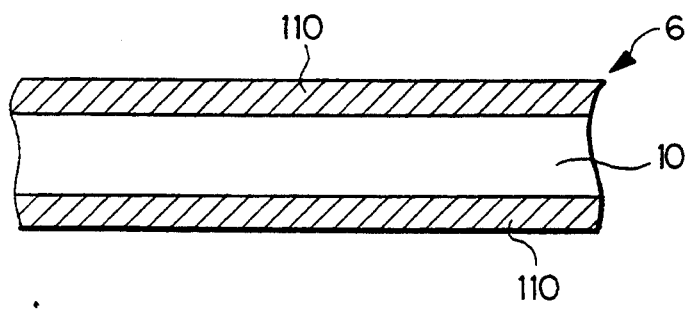
FIG. 4 is a partial sectional view of a flexible magnetic disc in a magnetic recording disc according to the present invention.

In FIG. 4 is illustrated one example of flexible magnetic disc 6, in which flexible non-magnetic support 10 has provided on double sides thereof magnetic layer 110 mainly comprising a ferromagnetic powder and a binder resin. The flexible magnetic disc may be a single-sided disc having a magnetic layer on only one side, but a double-sided disc is preferred from the standpoint of recording capacity, anticurling properties, and the like. A double-sided disc whose magnetic layers have the same composition is particularly preferred.

The liner according to the present invention comprises from 70 to 80% by weight, preferably from 73 to 76% by weight (based on the total weight of the liner), of rayon fiber and from 20 to 30% by weight, preferably from 24 to 27% by weight (based on the total weight of liner), of polypropylene fiber. A polypropylene fiber content of less than 20% is insufficient for functioning as an adhesive medium in fabrication of sheets of nonwoven fiber into a liner by heat-fusing (bonding), such as calendering, etc., only resulting in a failure of fabrication into a liner or fluffing of rayon fibers. If the polypropylene fiber content exceeds 30%, a large number of small particles would be formed by heat-melting of the polypropylene fiber as observed with the conventional liners. Such small particles may fall off to cause dropout or makes the nonwoven fabric harder to cause scratches on a magnetic layer.

The nonwoven fabric layer which mainly comprises rayon fiber and forms an outer layer on the magnetic layer side has a rayon fiber content of generally at least 80% by weight and preferably from 90% by weight to 100% by weight. The nonwoven fabric layer which mainly comprises polypropylene fiber and forms an intermediate layer or an inner layer has a polypropylene fiber content of generally at least 60% by weight and preferably from 60% by weight to 100% by weight. Other fibers which may constitute these nonwoven fabric layers are not particularly limited and may include, for example, polyester fiber, acrylic fiber and nylon fiber in an amount of generally less than 20% by weight.

If desired the liner according to the present invention may contain various additives, such as lubricants, antifungals, and antistatic agents.

The liner preferably has a thickness of generally from 100 to 400 μm, and more preferably from 120 to 300 μm. The term "thickness" as referred to herein means an average of values measured with a compressive elasticity testing machine at 5 points along the width direction in an area of 5 cm$^2$ under a load of 6 g/cm$^2$ or 20 g/cm$^2$.

Rayon fiber which can be used in the present invention includes viscose rayon, cupro-ammoniumrayon, and acetate rayon. The rayon fiber (staple) preferably has a tensile strength of from about 2.0 to 4.0 g/d, an elongation of from about 12 to 28%, a modulus at 3% elongation of from about 50 to 85%, an initial Young's modulus of from 400 to 950 kg/mm$^2$, and a specific gravity of from 1.50 to 1.52.

Polypropylene fiber which can be used in the present invention preferably includes fiber prepared by bringing a propylene monomer into contact with a solvent followed by polymerization at room temperature to 80° C. under a pressure of from 3 to 10 kg/cm$^2$. The polypropylene fiber (staple) preferably has a tensile strength of from about 250 to 400 kg/cm$^2$, an elongation of from about 200 to 800%, an initial Young's modulus of from 200 to 1200 kg/cm$^2$, and a specific gravity of from 0.90 to 0.91.

In order to further enhance the effects of the present invention, it is effective to subject the liner to embossing to give unevenness to the surface. The contact area of the liner with a magnetic layer is thereby decreased to reduce the coefficient of friction therebetween particularly under a high humidity condition. Thus, a liner with the embossed surface hardly scratches a magnetic layer and so reduces the occurrence of dropout.

Embossing may be carried out by calendering, application of hot air, application of ultrasonic waves, and the like. Embossing by calendering is accomplished by passing nonwoven fabric through an engraved embossing roll and a smooth roll, both heated. The embossed pattern can arbitrarily be changed by changing the engraved pattern of the embossing roll.

The liner is fixed to the inner wall of a disc container usually by heat-fusing or ultrasonic welding.

The disc container which can be used in the present invention includes those for 5.25 inch and 8 inch flexible magnetic discs, called jackets, which are made mainly from vinyl chloride resins and those for 3.5 inch flexible magnetic discs, called cartridges, which are made from ABS resins, polystyrene resins, etc.

The magnetic layer of the flexible magnetic disc mainly comprises a binder resin having dispersed therein a ferromagnetic powder. Examples of suitable ferromagnetic powders include $\gamma$-Fe$_2$O$_3$, Fe$_3$O$_4$, FeO$_x$ (x=1.33 to 1.5), CrO$_2$, Co-doped $\gamma$-Fe$_2$O$_3$, Co-doped FeO$_x$ (x=1.33 to 1.5), ferromagnetic metal powders, and tabular hexagonal ferrite powders.

The magnetic recording medium of the present invention demonstrates its advantages particularly when applied to high-density recording discs using a ferromagnetic metal powder or barium ferrite powder of small particle size. In general, where a ferromagnetic metal powder or barium ferrite powder having small particle size is used as a ferromagnetic powder, and particularly where the recording disc is used under a high humidity condition, the magnetic layer is liable to be damaged by a container liner. This problem is effectively coped with by the present invention.

The ferromagnetic metal powder which can be used in the present invention preferably has a specific surface area ($S_{BET}$) of from 30 to 60 m$^2$/g and a crystallite size of from 100 to 300 A as measured by X-ray diffractometry. A ferromagnetic metal powder having too small a specific surface area cannot sufficiently meet the demand for high-density recording, and that having too large a specific surface area cannot be sufficiently dispersed in a binder resin, failing to form a magnetic layer with a smooth surface, which also cannot meet high-density recording. The tabular hexagonal ferrite powder which can be used in the present invention has a specific surface area ($S_{BET}$) of from 25 to 50 m$^2$/g, a tabular ratio of from 2 to 6, and a length in the long axis of from 0.02 to 1.0 μm. Too large or too small a particle size makes high-density recording difficult for the same reasons as to a ferromagnetic metal powder.

The above-mentioned ferromagnetic metal powder should contain at least Fe. Specific examples of such ferromagnetic metal powders are Fe and Fe-Co, Fe-Ni or Fe-Ni-Co alloys. In order to obtain a high-density recording disc, these ferromagnetic metal powders have a saturation magnetization of at least 110 emu/g, and preferably 120 emu/g or higher, besides a small particle size. The ferromagnetic metal powder has a coercive force of at least 800 Oe, and preferably 900 Oe or higher. The tabular ratio (long axis/short axis) of the ferromagnetic metal powder is preferably 5 or more. Non-metals, e.g., B, C, Al, Si, and P, may be added to the composition for further improving characteristics. An oxide layer for chemical stabilization is usually formed on the surface of the metal powder particles.

The above-mentioned tabular hexagonal ferrite is a ferromagnetic substance having a plate shape with the axis of easy magnetization being perpendicular to the plate surface. Specific examples include barium ferrite, strontium ferrite, lead ferrite, calcium ferrite, and cobalt-substituted compounds thereof, with Co-substituted barium ferrite and Co-substituted strontium ferrite being preferred. If desired, other elements, e.g., In, Zn, Ge, Nb, and V, may be added to improve the characteristics.

Besides having a small particle size as described above, the tabular hexagonal ferrite powder should have a saturation magnetization of at least 50 emu/g, and preferably 53 emu/g or higher, for achieving high-density recording. The ferrite powder has a coercive force of at least 500 Oe, and preferably 600 Oe or higher.

The binder resin which can be used in the magnetic layer is conventional and includes thermoplastic resins, thermosetting resins, reaction type resins, and mixtures thereof. Examples of suitable binder resins include vinyl chloride copolymers, e.g., a vinyl chloride-vinyl acetate copolymer, acrylic ester copolymers, methacrylic ester copolymers, urethane elastomers, cellulose derivatives, and epoxy-polyamide resins. Various kinds of polyisocyanates may be used as a curing agent.

For improving dispersibility, it is desirable to introduce an adequate amount of a polar functional group, such as a carboxylic acid group, a sulfonic acid group, a hydroxyl group, an amino group or an epoxy group, into the resin molecule.

The binder resin is used in an amount usually of from 5 to 60 parts by weight, preferably from 10 to 50 parts by weight, and more preferably from 15 to 40 parts by weight, per 100 parts by weight of the ferromagnetic powder.

The magnetic layer usually contains various functional additives, such as abrasives, dispersants, antistatic agents, and so on.

For example, running durability of the magnetic layer can be improved by incorporation of 3 to 20 parts by weight of a fatty acid ester and 5 to 20 parts by weight of an abrasive having a Mohs' hardness of 6 or more each per 100 parts by weight of the ferromagnetic powder.

If the amount of the fatty acid ester in the magnetic layer is too small, the magnetic layer is apt to scratch under a high humidity condition. The fatty acid ester, if added in too large an amount, induces plasticization of the binder resin to reduce the film quality of the magnetic layer, resulting in a reduction in durability or an increase in torque under a high humidity condition.

Fatty acid esters which can be added preferably include those obtained from a fatty acid having from 6 to 22, preferably from 12 to 22, carbon atoms and an aliphatic alcohol having from 4 to 22, preferably from 4 to 18 carbon atoms. Addition of these fatty acid esters reduced a coefficient of dynamic friction on sliding of a flexible magnetic disc with a liner and thereby stabilizes running. Fatty acid esters having too small a carbon atom number readily volatilize from a magnetic layer in relatively high temperatures. As a result, the fatty acid ester locally falls short with time during long-term storage, failing to improve running properties. On the other hand, those having too large a carbon atom number have an increased viscosity to cause the liner to adhere to the magnetic layer, also resulting in a reduction in running properties especially in low temperatures. As far as the carbon atom number of the fatty acid ester falls within the above-mentioned range, a choice of the fatty acid ester to be added can be made irrespective of whether the starting fatty acid or alcohol is branched or straight or the isomeric structure (cis-, trans-, etc.), the number or the branching position of the alcohol linkage. In order to impart lubricity to a magnetic layer under ordinary conditions, fatty acid esters having a melting point of not higher than 30° C. are preferred.

Of the above-mentioned fatty acid esters, preferred are butyl myristate, butyl stearate, ethyl stearate, amyl stearate, hexadecyl stearate, and oley oleate.

If desired, the above-mentioned fatty acid ester. which is a preferred lubricant, may be used in combination with other lubricants, such as silicone oil, graphite, molybdenum disulfide, boron nitride, graphite fluoride, fluorine alcohol, polyolefins (e.g., polyethylene wax), polyglycols (e.g., polyethylene oxide wax), alkylphosphoric esters, and tungsten disulfide.

Abrasives which can be added to the magnetic layer preferably include those having a Mohs' hardness of 6 or higher, such as fused alumina, silicon carbide, chromium oxide, corundum, artificial corundum, diamond, artificial diamond, garnet, and emery (mainly comprising corundum and magnetite). These abrasives have a Mohs' hardness of 6 or higher and preferably have an average particle size of from 0.3 to 1.0 $\mu$m, and more preferably from 0.4 to 0.8 $\mu$m. The abrasive is used in an amount of usually 5 parts by weight or more, preferably from 5 to 20 parts by weight, and more preferably from 5 to 15 parts by weight, per 100 parts by weight of the ferromagnetic powder. Addition of a lower amount fails to obtain sufficient durability, and addition of a higher amount leads to decrease in packing density, failing to assure sufficient output.

Antistatic agents which can be added to a magnetic layer include conductive particles, such as graphite, carbon black, and carbon black-grafted polymers; natural surface active agents, such as saponin; nonionic surface active agents, such as alkylene oxide derivatives, glycerin derivatives, glycidol derivatives, polyhydric alcohols, polyhydric alcohol esters, and alkylphenolethylene oxide adducts; cationic surface active agents, such as higher alkylamines, cyclic amines, hydantoin derivatives, amidoamines, esteramides, quaternary ammonium salts, heterocyclic compounds (e.g., pyridine), and phosphonium or sulfonium salts; anionic surface active agents containing an acid group, e.g., a carboxylic acid group, a sulfonic acid group, a phosphoric acid group or a sulfuric ester group; and amphoteric surface active agents, such as amino acids, aminosulfonic acids, sulfuric acid esters or phosphoric acid esters of aminoalcohols, and alkyl betaines.

The flexible non-magnetic support which can be used in the flexible magnetic disc includes films, plates, etc. of synthetic resins, such as polyester resins (e.g., polyethylene terephthalate and polyethylene 2,6-naphthalate), polyolefin resins (e.g., polypropylene), cellulose derivatives (e.g., cellulose triacetate and cellulose diacetate), vinyl resins (e.g., polyvinyl chloride), polycarbonate resins, polyamide resins, polyimide resins, polyamide-imide resins, polysulfone resins, and polyether sulfone resins.

The flexible magnetic disc is produced by coating a magnetic coating composition prepared by dispersing the above-described various components in an organic solvent on a non-magnetic support and drying.

Examples of suitable organic solvents for the preparation of a magnetic coating composition include ketones, e.g., acetone, methyl ethyl ketone, methyl isobutyl ketone, cyclohexanone, isophorone, and tetrahydrofuran; alcohols, e.g., methyl alcohol, ethyl alcohol, propyl alcohol, butyl alcohol, isobutyl alcohol, isopropyl alcohol, and methylcyclohexanol; esters, e.g., methyl acetate, ethyl acetate, butyl acetate, isobutyl acetate, isopropyl acetate, ethyl lactate, monoethyl ether glycol acetate, and glycol acetate; ethers, e.g., monoethyl ether, diethyl ether, glycol dimethyl ether, glycol monoethyl ether, and dioxane; aromatic hydrocarbons, e.g., benzene, toluene, xylene, cresol, chlorobenzene, and styrene; chlorinated hydrocarbons, e.g., methylene chloride, ethylene chloride, carbon tetrachloride, chloroform, ethylene chlorohydrin, and dichlorobenzene; N,N-dimethylformamide, and hexane.

Preparation of the magnetic coating composition can be conducted by means of various kneading machines, such as a two-rod roll mill, a three-rod roll mill, a ball mill, a pebble mill, a Trommel, a sand grinder, a Szegvari, an attritor, a high-speed impeller dispersing machine, a high-speed stone mill, a high-speed impact mill, a disper, a kneader, a high-speed mixer, a homogenizer, and ultrasonic dispersing machine.

The magnetic coating composition is coated to provide a single or multilayered magnetic layer having a total dry thickness of from about 0.5 to 12 $\mu$m, which is decided according to the final use, shape, specifications, etc. of the magnetic recording disc.

If desired, the coated magnetic layer may be subjected to a treatment for orientation of the magnetic substance before drying. Further, the magnetic layer may be subjected to a surface smoothing finish either before or after drying and cut to a desired shape. In particular, a surface smoothing finish was found to provide a magnetic recording disc with a smooth surface and excellent resistance to wear. The surface smoothing finish can be carried out by smoothing before drying or calendering after drying.

The present invention will now be illustrated in greater detail with reference to Examples in view of Comparative Examples, but it should be understood that the present invention is not construed as being limited thereto. All the parts and percents are by weight unless otherwise indicated.

EXAMPLE 1

| | |
|---|---|
| Ferromagnetic powder (Co-substituted barium ferrite; specific surface area ($S_{BET}$): 35 m$^2$/g; length in the long axis: 0.06 $\mu$m; tabular ratio: 5) | 100 parts |
| Binder resin (polar group-containing vinyl chloride copolymer; —SO$_3$Na: 8 × 10$^{-5}$: eq./g; number average molecular weight: 75,000) | 10 parts |
| Abrasive (Al$_2$O$_3$; average particle size: 0.3 $\mu$m) | 7 parts |
| Carbon black: | |
| "Ketjen Black EC" produced by Lion Akzo Co., Ltd.; average particle size: 30 $\mu$m | 5 parts |
| "Thermacs MT" produced by Carcarb Co.; average particle size: 280 $\mu$m) | 2 parts |
| Solvent: | |
| Toluene | 36 parts |
| Methyl ethyl ketone | 36 parts |

The above components were kneaded in a kneader for about 2 hours to prepare a uniform dispersion. To the resulting dispersion were added the following components, followed by finely dispersing in a sand grinder at

| | |
|---|---|
| Binder resin (polar group-containing polyester polyurethane resin; —SO$_3$Na: 1 × 10$^{-4}$ eq./g; weight average molecular weight: 35,000) | 5 parts |
| Solvent: | |
| Toluene | 250 parts |
| Methyl ethyl ketone | 250 parts |

The resulting dispersion was uniformly mixed with 6 parts of a polyisocyanate ("Coronate L" produced by Nippon Polyurethane Co., Ltd.) and 6 parts of tridecyl stearate (as fatty acid esters) to prepare a magnetic coating composition having uniformly dispersed therein a ferromagnetic powder.

The magnetic coating composition was coated on both sides of a 75 $\mu$m thick polyethylene terephthalate film (having a width of 300 mm) by gravure coating to a dry thickness of 2.5 $\mu$m on each side. After drying, the coated film was calendered at about 100° C. and blanked to obtain a 3.5 inch magnetic recording disc.

A card web composed of a rayon fiber (viscose rayon) layer as an outer layer (magnetic layer side) and an inner layer (container side) and a polypropylene fiber layer as an intermediate layer was prepared. The web comprised 75% (based on the total weight of the web) of rayon fiber and 25% (based on the total weight of the web) of polypropylene fiber. The web was calendered and embossed at 270° C. to obtain nonwoven fabric having a basis weight of 36 g/m$^2$ and a thickness of about 220 $\mu$m (thickness of polypropylene fiber layer: about 50 $\mu$m) by a spun bonding method.

The nonwoven fabric was fixed to the inner wall of a cartridge case, and the above prepared 3.5 inch flexible magnetic disc was put therein to obtain a magnetic recording disc.

EXAMPLE 2

A magnetic recording disc was prepared in the same manner as in Example 1, except that 5 parts of oleyl oleate was used in place of 6 parts of tridecyl stearate (as fatty acid esters).

COMPARATIVE EXAMPLE 1

A magnetic recording medium was prepared in the same manner as in Example 1, except that the three-layered nonwoven fabric as a liner was replaced with a uniform mixed fiber layer comprising rayon fiber and polypropylene fiber.

COMPARATIVE EXAMPLE 2

A magnetic recording disc was prepared in the same manner as in Example 1, except that the weight ratio of the polypropylene fiber in the nonwoven fabric of the liner was changed to 40% based on the total weight of the liner.

COMPARATIVE EXAMPLE 3

A magnetic recording disc was prepared in the same manner as in Example 1, except for replacing the polypropylene fiber as an intermediate layer in the nonwoven fabric of the liner with polyester fiber.

In this case, the cutting fabricability of the nonwoven fabric was so poor that the rate of non-defective liners (i.e., yield) was reduced to half.

COMPARATIVE EXAMPLE 4

A magnetic recording disc was prepared in the same manner as in Example 1, except for replacing the polypropylene fiber as an intermediate layer in the nonwoven fabric of the liner with nylon 6 fiber.

Each of the magnetic recording disc obtained in Examples 1 and 2 and Comparative Examples 1 to 3 was tested as follows.

Before testing, all the tracks of each disc were subjected to missing pulse error testing with a tester "HFQ-35" (manufactured by Haiteku Seiko K.K.) to confirm that there was no dropout. After conditioning at 5° C. and 80% RH or under standard room conditions for at least 24 hours, the medium was repeatedly inserted in and removed from a 3.5 inch floppy disc drive "PD 211" (manufactured by Toshiba Co., Ltd.) 10000 times with the head position on track 20 and the motor revolution "on" (300 rpm) in the respective environment. Each medium (disc) was taken out of each environment taking care not to cause moisture condensation. After allowing to stand for 24 hours, the tracks of the disc were again inspected, and the number of tracks suffering from an increase in dropout from the initial value was counted. The terminology "dropout" as used in the evaluation means a drop of a 1 bit or higher output to 45% or less from the initial output.

The positions developing dropout were observed with a microscope to find out a nucleus causing the dropout. The component of the nucleus was analyzed with FTIR (i.e., Fourier Transform Infrared Spectrophotometer). For references, each component used in the liner was similarly analyzed with FTIR.

Further, the cartridge case of each medium was opened after missing pulse error testing, and the surface of the magnetic layer was observed with the naked eye and rated "good" (no change was observed) or "bad" (a large number of fine deposits were found over the entire surface of the magnetic layer).

The results of these measurements and observations are shown in Table 1 below.

Furthermore, humidity dependence of the running torque was evaluated as follows, and the results obtained are shown in FIG. 5.

A sample disc was run on "PD 211" with the head position being fixed at track 00 for 3 hours, and the rotation torque of the disc (running torque) was calculated from the power consumed for revolution of the spindle motor. The running test was conducted at 23° C. and 50% RH for the first 1 hour, 23° C. and 80% RH for the next 1 hour, and then at 23° C. and 50% RH for the final 1 hour. The running torque during running was monitored with a pen recorder.

TABLE 1

Durability against 1000 Times Insertion and Removal

| Example No. | Liner Cutting Properties | Number of Tracks with Increased Dropout | Surface of Magnetic Layer | Nuclei of Dropout | Humidity Dependence of Torque |
|---|---|---|---|---|---|
| Example 1 | good | 0 | good | — | no change |
| Example 2 | good | 0 | good | — | no change |
| Compar. Example 1 | good | 60 | bad | polypropylene | no change |
| Compar. Example 2 | good | 30 | bad | polypropylene | no change |
| Compar. Example 3 | bad | 10 | good | polyester | small change |
| Compar. Example 4 | good | 0 | good | — | great change |

As is apparent from the results in Table 1, the discs according to the present invention suffer from no adhesion of the liner component due to fall-off and no occurrence of dropout. In the samples of Comparative Example 1 using a liner comprising rayon/polypropylene mixed fiber and Comparative Example 2 using a liner containing 40% (based on the total weight of the liner) of polypropylene fiber, the polypropylene fiber fell off to cause dropout. The nonwoven fabric used in Comparative Example 3 produced much cutting dust on fabrication into a liner because the physical properties greatly differ between polypropylene fiber and polyester fiber, and the dust entered the liner and afterward adhered to the magnetic layer to cause dropout. As is apparent from FIG. 5, the sample of Comparative Example 4 using a liner comprising nylon 6 fiber suffered from a considerable increase in running torque under a high humidity condition as compared with the sample of Example 1 or Comparative Example 1 or 2 using no nylon 6 fiber.

As described above, according to the present invention, a magnetic recording disc which does not suffer from dropout which may arise from fiber dust remaining in a liner of the container or from fibers fallen on repetition of insertion and remove from a drive can be obtained by using a liner comprising a nonwoven fabric layer mainly comprising rayon fiber on the magnetic layer side and a nonwoven fabric layer mainly comprising polypropylene fiber on the container side.

In addition, the magnetic recording disc does not suffer from an increase in torque even when used under a high humidity condition.

While the invention has been described in detail and with reference to specific examples thereof, it will be apparent to one skilled in the art that various changes and modifications can be made therein without departing from the spirit and scope thereof.

What is claimed is:

1. A combination of a magnetic recording disc and a container for said disc, said container comprising a nonwoven fabric liner, said disc comprising a flexible magnetic disc comprising a flexible non-magnetic support having on at least one side thereof a magnetic layer mainly comprising a ferromagnetic powder and a binder resin, said disc being rotatable within said container, wherein said liner comprises (1) a first nonwoven fabric layer comprising rayon fiber in an amount of at least 80% by weight on at least a side thereof in contact with said magnetic layer, and (2) a second nonwoven fabric layer mainly comprising polypropylene fiber, and wherein said liner comprises from 70 to 80% by weight based on the weight of said liner of rayon fiber and from 20 to 30% by weight based on the weight of said liner of polypropylene fiber.

2. The combination of a magnetic recording disc and container as claimed in claim 1, wherein said liner comprises (1) an outer layer of said first nonwoven fabric layer in contact with said magnetic layer and an inner layer of said first nonwoven fabric layer located on a container side and (2) an intermediate layer of said second nonwoven fabric layer interposed therebetween.

3. The combination of magnetic recording disc and container as claimed in claim 1, wherein said first nonwoven fabric layer comprises at least 80% by weight of said rayon fiber, and said second nonwoven fabric layer comprises at least 60% by weight of polypropylene fiber.

4. The combination of a magnetic recording disc and container as claimed in claim 1, wherein said liner has a thickness of from 100 to 400 $\mu$m.

5. The combination of a magnetic recording disc and container as claimed in claim 1, wherein said liner is embossed.

* * * * *